United States Patent
Yamagata et al.

(10) Patent No.: US 12,137,190 B2
(45) Date of Patent: Nov. 5, 2024

(54) IMAGE READING DEVICE

(71) Applicant: Mitsubishi Electric Corporation, Tokyo (JP)

(72) Inventors: Kosaku Yamagata, Tokyo (JP); Hironobu Arimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 181 days.

(21) Appl. No.: 17/428,980

(22) PCT Filed: Mar. 18, 2020

(86) PCT No.: PCT/JP2020/012020
§ 371 (c)(1),
(2) Date: Aug. 6, 2021

(87) PCT Pub. No.: WO2020/196168
PCT Pub. Date: Oct. 1, 2020

(65) Prior Publication Data
US 2022/0014641 A1    Jan. 13, 2022

(30) Foreign Application Priority Data

Mar. 25, 2019    (JP) .................................. 2019-055995

(51) Int. Cl.
*H04N 1/03* (2006.01)
*G02B 3/00* (2006.01)
(Continued)

(52) U.S. Cl.
CPC ........... *H04N 1/0306* (2013.01); *G02B 3/005* (2013.01); *G02B 5/003* (2013.01); *G02B 7/021* (2013.01); *H04N 1/031* (2013.01); *H04N 1/1912* (2013.01)

(58) Field of Classification Search
CPC .... H04N 1/0306; H04N 1/031; H04N 1/1912; H04N 1/191
See application file for complete search history.

(56) References Cited

U.S. PATENT DOCUMENTS

| 4,432,022 A | * | 2/1984 | Tokumitsu | ............. | H04N 1/193 |
| | | | | | 348/832 |
| 5,661,540 A | * | 8/1997 | Kaihotsu | ............. | G02B 3/0087 |
| | | | | | 355/1 |

(Continued)

FOREIGN PATENT DOCUMENTS

| DE | 102016200287 A1 | * | 7/2017 | ........... G02B 13/001 |
| JP | 56-161772 A | | 12/1981 | |

(Continued)

OTHER PUBLICATIONS

Office Action issued on Feb. 8, 2022, in corresponding Japanese patent Application No. 2021-509261, 8 pages.

(Continued)

*Primary Examiner* — Ted W Barnes
(74) *Attorney, Agent, or Firm* — XSENSUS LLP

(57) ABSTRACT

An image reading device can easily increase or improve the depth of field. The image reading device includes a lens array (1) including lenses (2) arrayed in a main scanning direction, a sensor array (4) including sensor elements (4) arrayed in the main scanning direction to receive light converged by the lenses (2), and an overlap preventer located between the lens array (1) and the sensor array (4) to prevent an overlap of images formed by the lenses (2). The overlap preventer includes a slit assembly (5) including at least one specific-light blocker or optically transparent columns (13).

16 Claims, 16 Drawing Sheets

(51) Int. Cl.
  *G02B 5/00* (2006.01)
  *G02B 7/02* (2021.01)
  *H04N 1/031* (2006.01)
  *H04N 1/191* (2006.01)

(56) References Cited

U.S. PATENT DOCUMENTS

| | | | | |
|---|---|---|---|---|
| 5,712,700 | A * | 1/1998 | Nagaishi | H04N 25/11 |
| | | | | 355/71 |
| 5,768,023 | A * | 6/1998 | Sawaki | H04N 1/0315 |
| | | | | 359/622 |
| 6,268,600 | B1 * | 7/2001 | Nakamura | G02B 6/0001 |
| | | | | 362/555 |
| 8,089,709 | B2 * | 1/2012 | Ito | G02B 3/005 |
| | | | | 359/793 |
| 10,270,944 | B2 * | 4/2019 | Kawano | H04N 1/028 |
| 10,908,342 | B2 * | 2/2021 | Schabacker | F21K 9/61 |
| 2008/0245981 | A1 * | 10/2008 | Hebert | B41C 1/1083 |
| | | | | 250/559.36 |
| 2009/0052044 | A1 * | 2/2009 | Nagata | G02B 3/0068 |
| | | | | 359/622 |
| 2010/0128353 | A1 * | 5/2010 | Nagata | G02B 3/0062 |
| | | | | 359/619 |
| 2012/0229878 | A1 * | 9/2012 | Nagata | G02B 26/101 |
| | | | | 359/201.1 |
| 2015/0053844 | A1 * | 2/2015 | Kitamura | G02B 3/005 |
| | | | | 250/208.1 |
| 2015/0109676 | A1 * | 4/2015 | Kobayashi | H04N 1/031 |
| | | | | 359/619 |
| 2018/0152581 | A1 * | 5/2018 | Murase | H04N 1/0305 |
| 2019/0222711 | A1 * | 7/2019 | Kobayashi | G02B 17/0621 |
| 2019/0285934 | A1 * | 9/2019 | Fujii | G02F 1/1335 |

FOREIGN PATENT DOCUMENTS

| | | | | |
|---|---|---|---|---|
| JP | 6-342131 A | | 12/1994 | |
| JP | 2000-35519 A | | 2/2000 | |
| JP | 2000035519 A | * | 2/2000 | |
| JP | 4161518 B2 | * | 10/2008 | |
| JP | 2009180976 A | * | 8/2009 | |
| JP | 2010219571 A | * | 9/2010 | G02B 5/003 |
| JP | 2015-108794 A | | 6/2015 | |
| WO | 2013/146873 A1 | | 10/2013 | |
| WO | WO-2021193945 A1 | * | 9/2021 | G02B 13/24 |
| WO | WO-2022064777 A1 | * | 3/2022 | |
| WO | WO-2022163157 A1 | * | 8/2022 | |

OTHER PUBLICATIONS

International Search Report and Written Opinion mailed on Jun. 23, 2020, received for PCT Application PCT/JP2020/012020, Filed on Mar. 18, 2020, 9 pages including English Translation.

Office Action issued on Jul. 5, 2022, in corresponding Chinese patent Application No. 202080019325.8, 12 pages.

* cited by examiner

IMAGE READING DEVICE

CROSS-REFERENCE TO RELATED APPLICATIONS

The present application is based on PCT filing PCT/JP2020/012020, filed Mar. 18, 2020, which claims priority to JP 2019-055995, filed Mar. 25, 2019, the entire contents of each are incorporated herein by reference.

TECHNICAL FIELD

The present disclosure relates to an image reading device that converges light transmitted through or reflected from a target to be read (or to be illuminated) with a lens array to perform reading with a sensor array.

BACKGROUND ART

Known image reading devices (an image-reading line image sensor and an image input device including the image sensor) illuminate a target to be read with light and converge light transmitted through or reflected from the target with an array of rod lenses to perform reading with a linearly arranged optical sensor array (see, for example, Patent Literature 1). Such image reading devices are used in, for example, a copier or a scanner that acquires electronic information representing images, characters, and patterns on a reading target.

Examples of a lens array in an image reading device include a rod lens array and a microlens array for an erect-unmagnified-image forming optical system. Such a lens array is used in a copier, a scanner, or another device that acquires electronic information representing images, characters, patterns, and other objects printed on media such as paper media. Patent Literature 1 describes an image reading device (line image sensor) including a rod lens array of rod-shaped lenses arrayed in accordance with a reading width and a linear light source that illuminates a reading target. The image reading device performs reading by forming an image of the light reflected from or transmitted through the illuminated target carrying information on an optical sensor array located opposite to the reading target with the lens array located in between.

The rod lens array described in Patent Literature 1 is formed from an inorganic material such as glass or resin with a refractive index distributed in a radial direction to form an erect-unmagnified-image forming system with a predetermined angular aperture and a conjugate length. Arranging such rod lenses in an array can provide a continuous linear image.

Nowadays, rod lens arrays have uses other than an input unit of, for example, a facsimile machine. Rod lens arrays may be used, for example, in backside-reading line image sensors installed in an automatic document feeder (ADF) in a document scanner or a copier, and for inspection in a manufacturing line such as a printing or film inspection in a commercial printing line. Although the focus is fixed, a rod lens has a short conjugate length (focal length), and thus can form an image input system more compact than a known optical system that reduces the image size to form images on a small sensor surface.

As being used more widely, rod lens arrays are expected to have more uses with the shorter conjugate length enabling the compact size of image sensor products. For wider use, rod lens arrays may overcome the low level of tolerance (shallow or small depth of field) for the positional relationship between the focal position and a reading target. For an in-line inspection of image-inspection paper or film printing, a reading target may be transported at a high speed of 200 m/min or higher. The target thus may flap and change the resolution of an image to be read. Such a change in resolution is to be avoided.

In one example of efforts to increase the depth of field in a line image sensor, an overlap limiter located between lens elements in a lens element set to limit an overlap of images formed by the lens elements. This controls the diameter for image formation of each lens element to increase (improve) the depth of field (see, for example, Patent Literature 1).

In another example, an opaque, light-absorption layer located around rod lenses may prevent the resolution from being lowered by an overlap of images formed by the rod lenses. This enables the rod lens array to have depth-of-field characteristics close to the depth-of-field characteristics of a single rod lens, thus increasing (or improving) the depth of field of a rod lens array as a whole (see, for example, Patent Literature 2).

The rod lenses with the opaque, light-absorption layer are arranged at intervals to achieve uniform characteristics of the rod lenses, reducing the difference in amount of light or resolution between the lenses generated in the structure described in Patent Literature 2 and increasing (improving) the depth of field (see, for example, Patent Literature 3).

CITATION LIST

Patent Literature

Patent Literature 1: Unexamined Japanese Patent Application Publication No. 6-342131
Patent Literature 2: Unexamined Japanese Patent Application Publication No. 2000-35519
Patent Literature 3: International Publication No. WO 2013/146873

SUMMARY OF INVENTION

Technical Problem

A line image sensor including a rod lens array is to achieve an intended depth of field. Various techniques have been developed to improve the depth of field to the same level as that achieved with a single lens. The technique described in Patent Literature 1 cannot limit entry of light incident on a limiter at a low angle.

The improved depth of field with each rod lens described in Patent Literature 2 is limited by the difficulty in achieving the uniform resolution or brightness against position deviation of a reading target in the depth direction, as described in Patent Literature 3. The technique described in Patent Literature 2 using a long line sensor may also cause the distribution of brightness to change due to environmental changes (particularly, changes in the relative positions of lenses and a sensor array due to thermal expansion difference caused by temperature changes). This may cause illumination or sensitivity variations independently of whether shading compensation is performed in advance, thus degrading the image quality.

In improving the depth of field with each rod lens, the size of an area for a part functioning as each lens may be reduced to allow the lens to be independent. This structure may reduce the amount of light for image formation and form dark images or may involve use of highly bright lighting. A faster reading system is thus unlikely to be achieved.

The technique described in Patent Literature 3 can achieve uniform resolution or brightness against the position deviation of a medium, unlike the technique in Patent Literature 2. However, the technique described in Patent Literature 3 involves more size reduction of an area for a part functioning as a lens than with the technique in Patent Literature 2. This technique may thus reduce the amount of light for image formation and form dark images or may involve use of highly bright lighting. A faster reading system is thus unlikely to be achieved.

The techniques described in Patent Literatures 2 and 3 use lenses with the basic characteristics to be changed and cannot cover various operation distances (distance from a lens end to a reading target) for various uses including inspection.

An objective of the present disclosure is to provide an image reading device that can easily increase or improve the depth of field without changing the basic characteristics of a lens.

Solution to Problem

An image reading device according to an aspect of the present disclosure includes a lens array including lenses arrayed in a main scanning direction, a sensor array including sensor elements arrayed in the main scanning direction to receive light converged by the lenses, and an overlap preventer located between the lens array and the sensor array to prevent an overlap of images formed by the lenses. The overlap preventer includes a slit assembly including at least one specific-light blocker or optically transparent columns.

Advantageous Effects of Invention

As described above, the image reading device according to the above aspect of the present disclosure limits the optical path to prevent light (specific light) incident at a low angle from directly entering the sensor elements 4 to increase (improve) the depth of field and reduce a decrease in the amount of light.

DESCRIPTION OF EMBODIMENTS

Embodiment 1

Figure 1A:
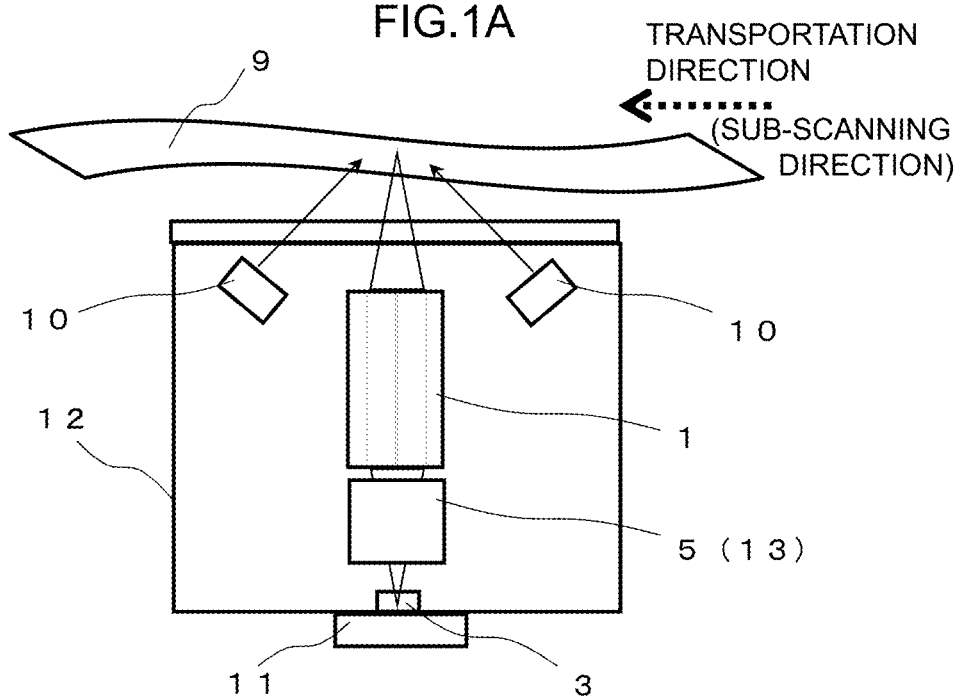
FIGS. 1A and 1B are schematic diagrams of an image reading device according to Embodiment 1.
Figure 1B:
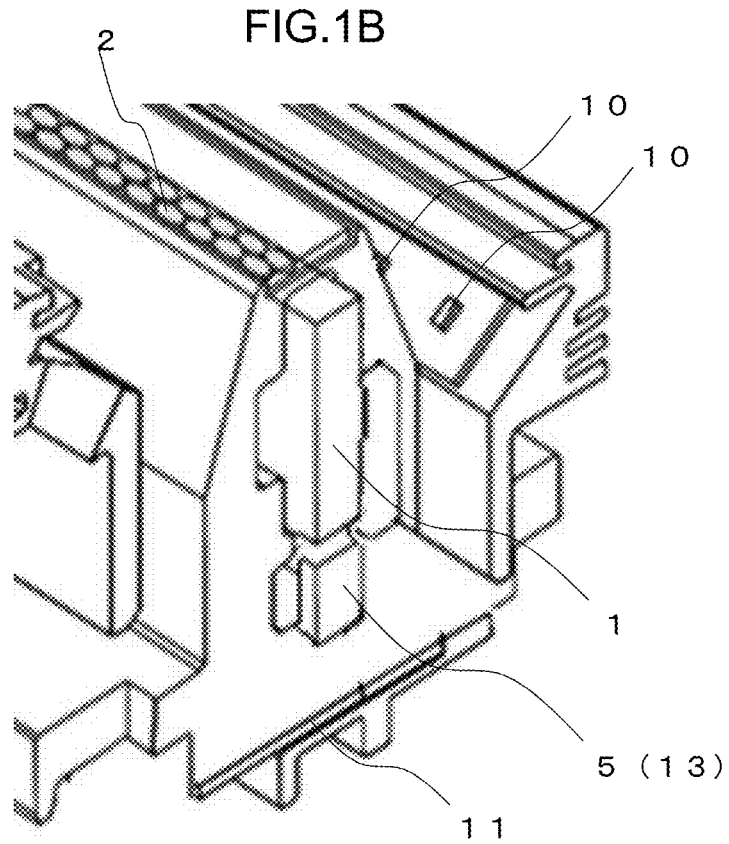
Figure 2:
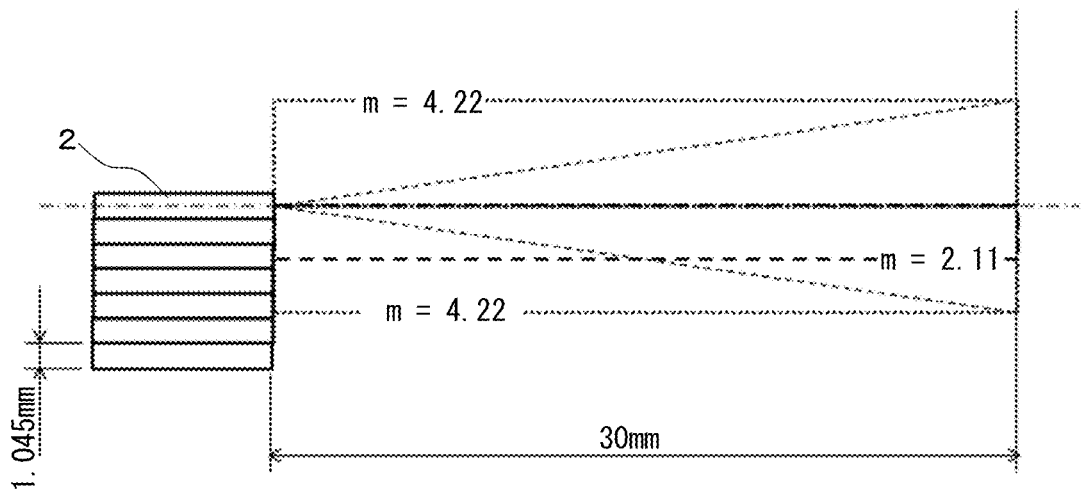
FIG. 2 is a diagram showing an overlap of images formed by the image reading device.
Figure 3A:
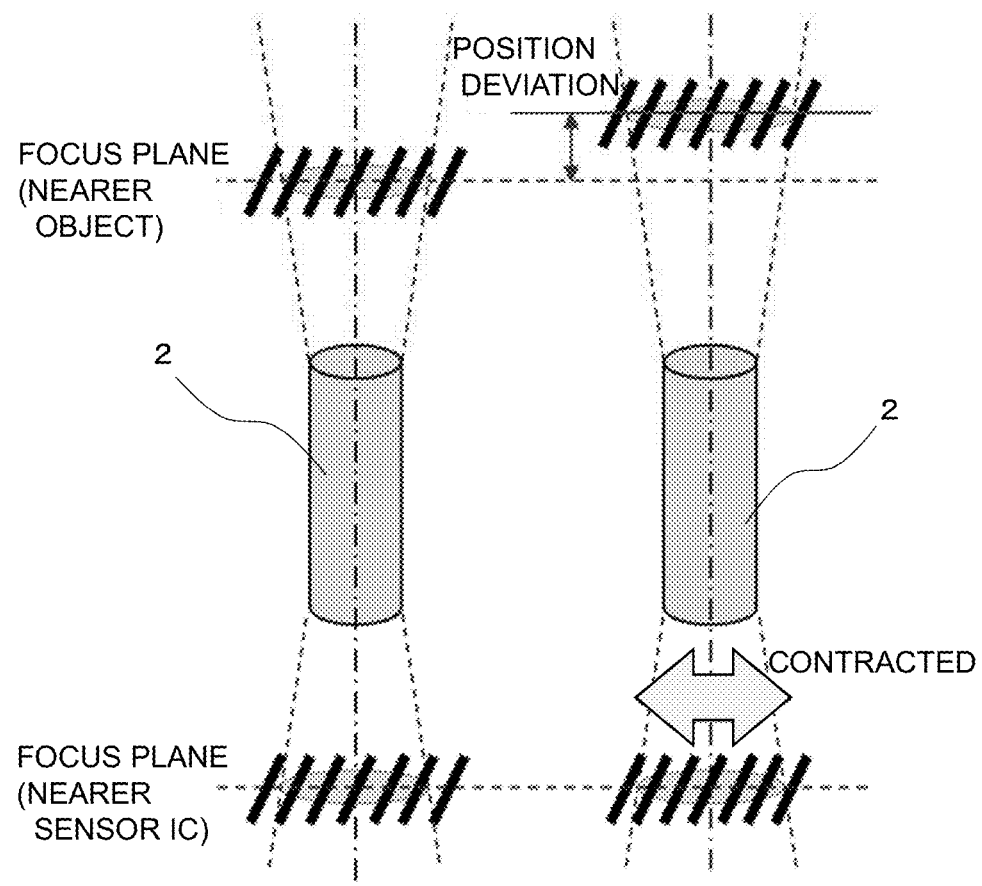
FIGS. 3A and 3B are diagrams showing an overlap of images formed by the image reading device.
Figure 3B:
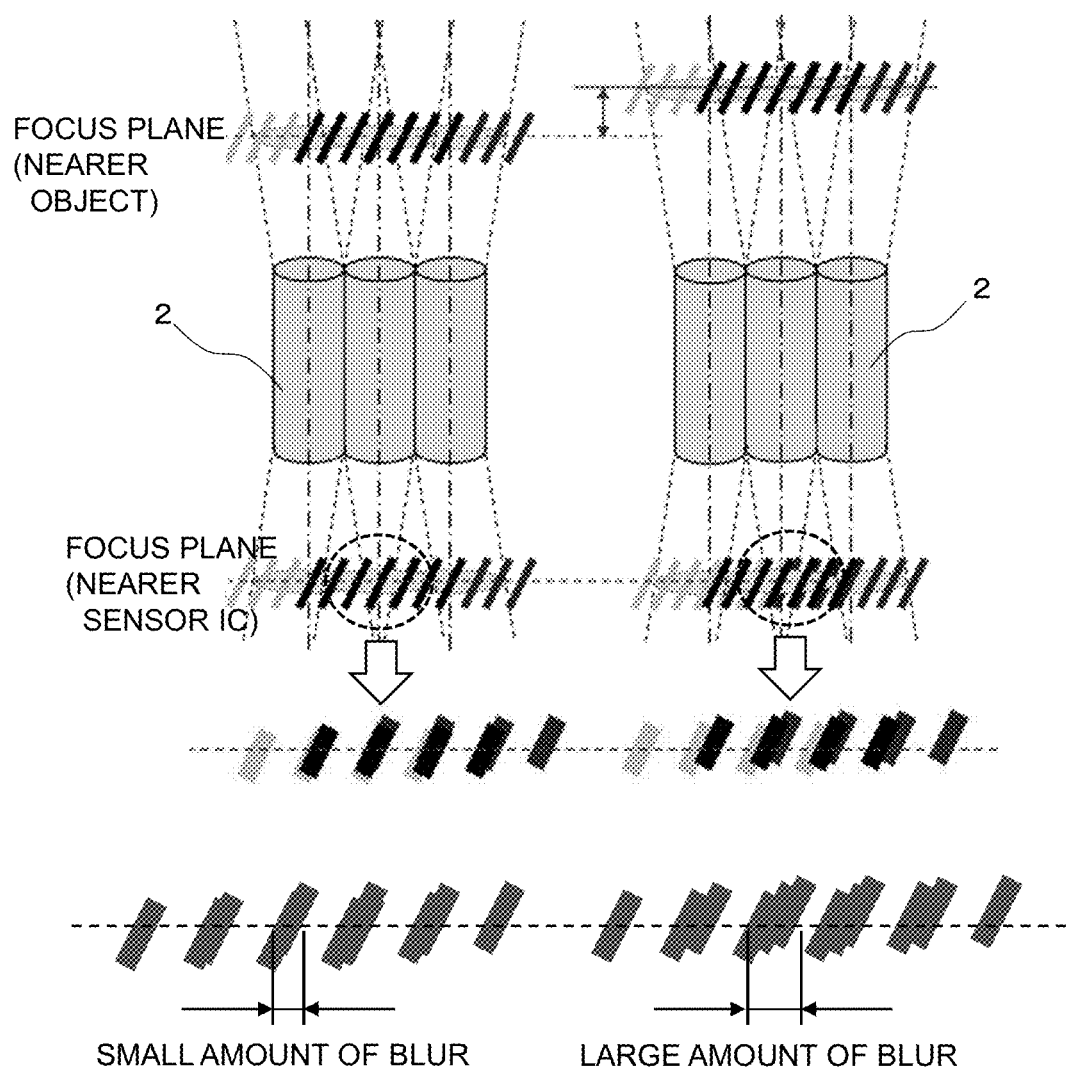

Embodiment 1 will now be described with reference to FIGS. 1 to 12. Throughout the figures, the same or corresponding components are denoted by the same reference numerals and will not be described in detail. FIG. 1A is a cross-sectional view of an image reading device taken along a plane parallel to a sub-scanning direction (transportation direction). FIG. 1B is a partial perspective view of the image reading device. FIG. 3A is a diagram of a single lens (rod lens) showing an overlap of images formed by the image reading device. FIG. 3B is a diagram of a lens array (rod lens array) showing an overlap of images formed by the image reading device.

In FIGS. 1 to 12, a lens array 1 is an array of lenses 2 arranged in a main scanning direction of the image reading device. The main scanning direction and a sub-scanning direction (transportation direction) intersect with each other or may be orthogonal to each other. The main scanning direction and the sub-scanning direction (transportation direction) are orthogonal to a focal depth direction (direction of the depth of field). In one or more embodiments of the present disclosure, the optical axis direction of the lens array 1 (lenses 2) is orthogonal to the main scanning direction and to the sub-scanning direction (transportation direction). In one or more embodiments of the present disclosure, each lens 2 is a rod lens 2 and the lens array 1 is a rod lens array 1, but the lens array 1 may be, for example, a microlens array 1. Each lens 2 may be the rod lens 2, a microlens 2, or another lens for an erect-unmagnified-image forming optical system. A sensor array 3 is an array of sensor elements 4 (sensor ICs 4) arranged in the main scanning direction. The sensor elements 4 receive light converged by the lenses 2. A slit assembly 5 is located between the lens array 1 and the sensor array 3 to prevent an overlap of images formed by the lenses 2. In the figures, slits in the slit assembly 5 correspond to the optical axes of the respective lenses 2, but the slits in the slit assembly 5 may not correspond to the pitches of the lenses 2. For example, a slit in the slit assembly 5 may be provided every one and a half times as long as the diameter of the lens 2. The slit assembly 5 includes sidewall plates 6, slit plates 7, and specific-light blockers 8. The slits in the slit assembly 5 are defined by the sidewall plates 6 and the slit plates 7. The slit assembly 5 can also be referred to as an overlap preventer 5 operable as an optical path limiter. FIGS. 8A and 11A are cross-sectional views taken along a plane parallel to the sub-scanning direction (transportation direction) of the slit assembly 5. FIGS. 8B and 11B are cross-sectional views taken along a plane parallel to the main scanning direction of the slit assembly 5.

In FIGS. 1 to 12, a reading target 9 (an illumination target 9 or an object 9) carries, mainly on the surface, objects to be represented by electronic information, such as images, characters, and patterns. Examples of the reading target 9 include sheets such as documents, paper money, and securities, substrates, and webs (such as fabric or cloth). The reading target 9 is transported in the sub-scanning direction (transportation direction). Light sources 10 illuminate the reading target 9 with light. The lens array 1 (lenses 2) converges light reflected from or transmitted through the reading target 9. In one or more embodiments of the present disclosure, the light sources 10 each are a light-emitting diode (LED) array and the lens array 1 converges light emitted from the light sources 10 and reflected by the reading target 9. A sensor substrate 11 is a substrate on which the sensor array 3 (sensor elements 4) is mounted. A housing 12 for the image reading device holds or accommodates the lens array 1 (lenses 2), the sensor substrate 11 (the sensor array 3 or the sensor elements 4), the slit assembly 5, and the light sources 10. The light sources 10 and the sensor substrate 11 may be outside the image reading device (housing 12). Transportation of the reading target 9 in the sub-scanning direction (transportation direction) may include transporting the reading target 9 and transporting the image reading device (housing 12).

More specifically, the image reading device according to Embodiment 1 is a line image sensor including the rod lens array 1, the light sources 10, and the sensor array 3. The light source 10 and the sensor array 3 are arranged around the rod lens array 1. The light sources 10 illuminate a portion of the reading target 9 at the center of reading for the rod lens array 1. The sensor array 3 converts a medium image formed by the rod lens array 1 into an electric signal. The role of the slit assembly 5 in the image reading device according to Embodiment 1 (line image sensor) and the basic functions of the slit assembly 5 will be described in detail below.

The role of the slit assembly 5 will first be described in detail. As described above, the line image sensor including the rod lens array 1 is to achieve an intended depth of field. An imaging optical system (lens) forms an entire image not with a single rod lens 2 alone. As shown in FIGS. 2, 3A, and 3B, the multiple rod lenses 2 form images that overlap one another to form the entire image.

As shown in FIGS. 2, 3A, and 3B, a lower depth of field is mainly caused by arrayed lenses, rather than by the characteristics of each lens. Images formed by adjacent lenses in the lens array are not superimposed at a normal position. The number of adjacent lenses is defined by an overlap degree m. The overlap degree m is a half of the value acquired by dividing, by the diameter of the rod lenses 2, the diameter of an area to which a single rod lens 2 transfers an image at the conjugate point. The images not superimposed at a normal position cause a blurred image. The overlap degree m denotes a parameter indicating the overlap degree of images formed by adjacent rod lenses 2 and indicates the number of lenses that form overlapping images in one direction of each lens from the central optical axis of the rod lens 2.

The rod lenses 2 are arrayed. Thus, as shown in FIG. 1, at the conjugate point, an area in which an image is formed by a single rod lens corresponds to an area of m lenses extending in each direction from the lens center, as indicated with the overlap degree. This indicates that light that has passed through 2×m rod lenses 2 is used to form a single image. To guarantee an intended resolution at the conjugate point, all the lenses are to have the same characteristics and to be arranged without errors to form images at the same point. However, the rod lenses 2 vary in optical characteristics and are assembled with errors. Thus, images transferred from the rod lens 2 slightly deviate from one another. The array thus reduces the resolution at the conjugate point with lower optical characteristics than that achieved with a single rod lens 2.

As shown on the left in FIG. 3A, when the reading target 9 and the sensor array 3 are located at the conjugate points, the rod lens 2 forms an erect unmagnified image. However, as shown on the right in FIG. 3A, when the reading target 9 is moved (away) from the conjugate point (from the focal position or focus plane in the figure), the image is contracted on the sensor array 3. In this case, the images formed by the individual rod lenses 2 are contracted on the sensor array 3. Thus, the images formed on the sensor array 3 by the individual rod lenses 2 in the rod lens array 1 slightly deviate from each other. Thus, as shown on the right in FIG. 3B, the resultant image has a larger amount of blur and a lower resolution than the image shown on the left in FIG. 3B.

Figure 4:
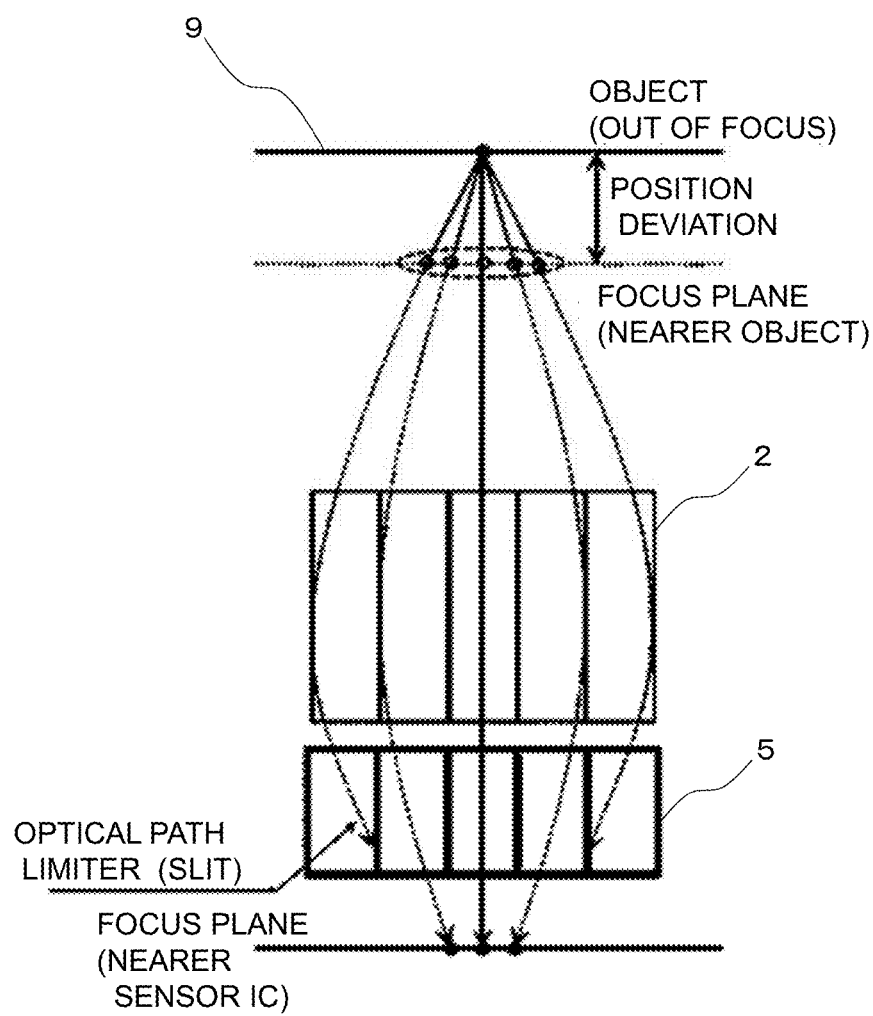
FIG. 4 is a schematic diagram of an overlap preventer (optical path limiter) in the image reading device according to Embodiment 1.

The reduced depth of field resulting from the lower resolution due to a greater distance of the reading target 9 from the conjugate point (focal position) is not mainly caused by the characteristics of each rod lens 2. The reduced depth of field is mainly caused by the rod lens array 1 including an array of the rod lenses 2. The optical axes of the adjacent rod lenses 2 defined by the overlap degree m described above are misaligned due to the difference in characteristics and assembly errors. The reading target 9 deviating from the focal position enlarges or contracts the images formed by the individual rod lenses 2. The images thus cannot be superimposed at a normal position on the sensor array 3 and deviate from each other, forming a blurred image. Thus, as shown in FIG. 4, the slit assembly 5 is used to avoid the reduced depth of field.

Figure 5:
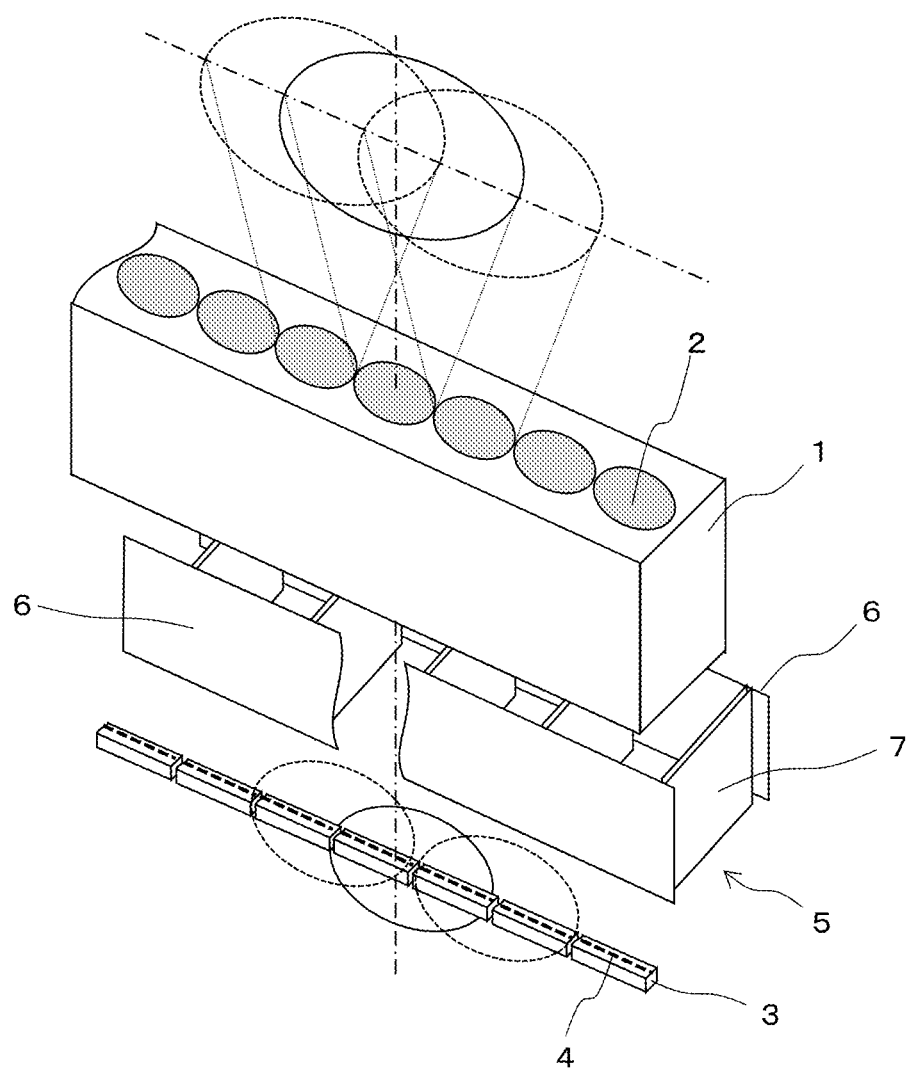
FIG. 5 is a schematic diagram of a lens array, the overlap preventer, and a sensor array in the image reading device according to Embodiment 1.
Figure 6:
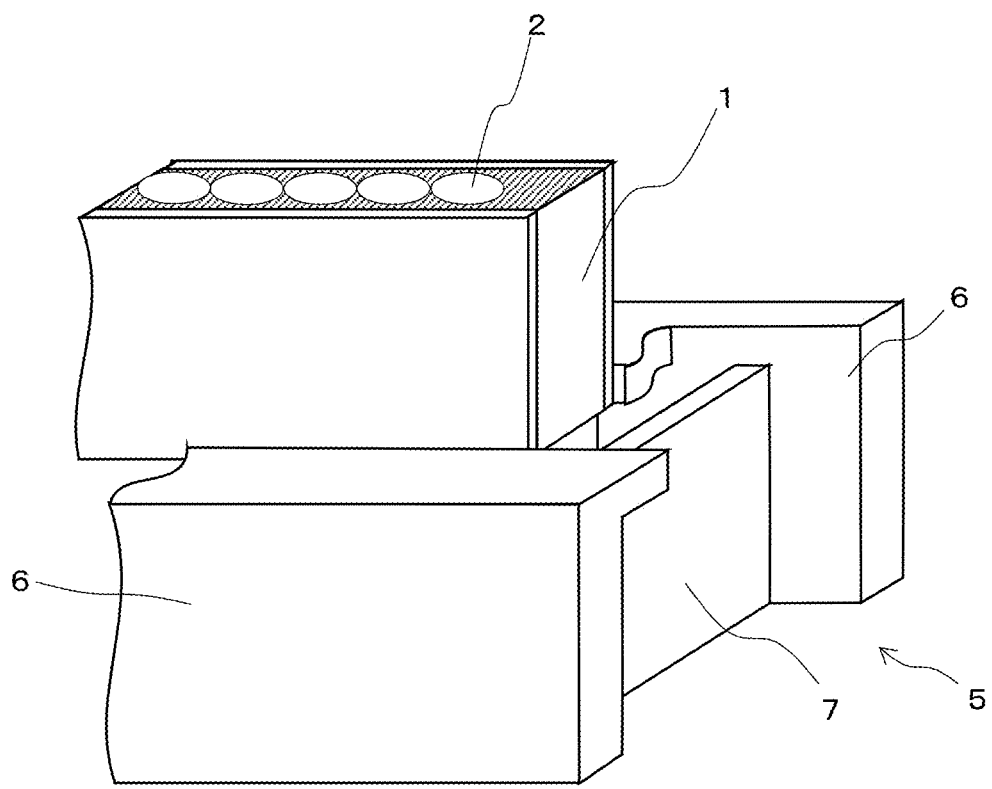
FIG. 6 is a schematic diagram of the lens array and the overlap preventer in the image reading device according to Embodiment 1.

The basic functions of the slit assembly 5 in the image reading device according to Embodiment 1 will now be described in detail with reference to FIGS. 5 to 9. The rod lenses 2 simply shown in FIGS. 5 and 6 each are SLA (product name) SLA9A with a single row manufactured by Nippon Sheet Glass Co., Ltd, with an angular aperture 9°, a conjugate length of about 80 mm, a lens diameter (I) of about 1.0 mm, and an overlap degree m of 4.2. In FIGS. 5 and 6, the slit assembly 5 is attached to the rod lens array 1. The slit assembly 5 shown in FIGS. 7, 8A, and 8B has a length L in the main scanning direction, a width W in the sub-scanning direction, and a height H in the optical axis direction. The length of each of the sidewall plates 6 in the main scanning direction corresponds to the length L. The dimension (height) of each of the slit plates 7 in the optical axis direction corresponds to the height H. Each of the slit plates 7 has a pitch e of about 2.0 mm in the main scanning direction, a thickness T of 0.2 mm, and a height H of 20 mm.

The wall surfaces of the slit assembly 5 shown in FIGS. 5 to 8 are black and velvety to minimize light reflection and block all rays of light incident on the surfaces of the slit assembly 5, including reflected light and scattered light. More specifically, the slit plates 7 and the specific-light blockers 8 may have black surfaces. The sidewall plates 6 may have black surfaces on at least surfaces continuous with the slit plates 7. The black surfaces may be black and velvety. The black velvety surfaces include a black and textured surface.

Figure 7:
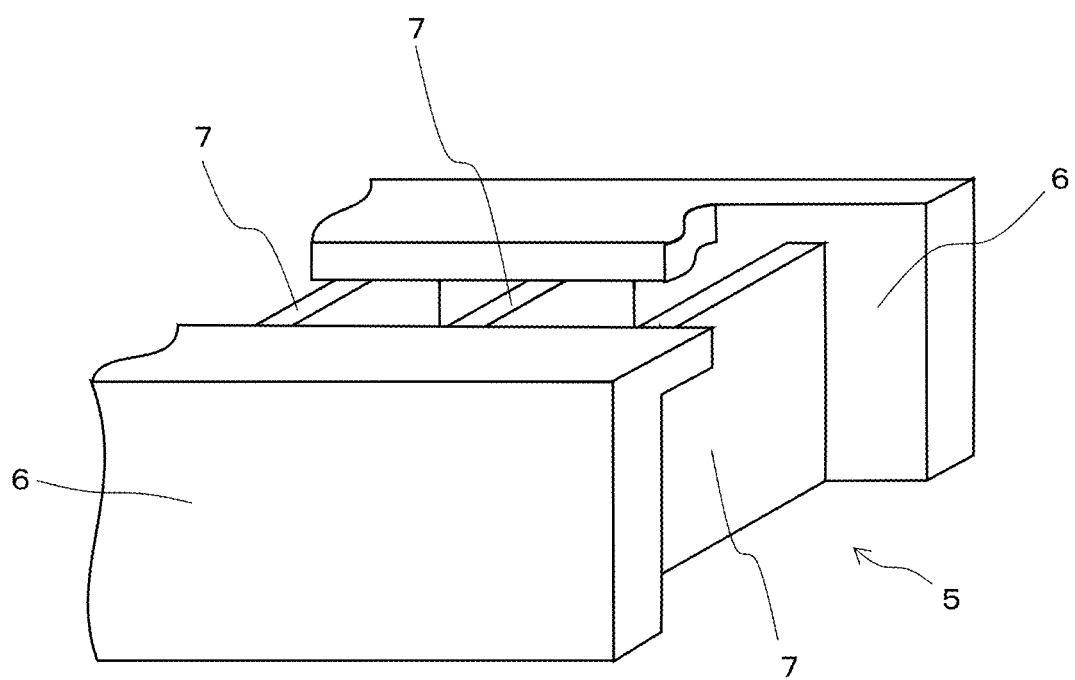
FIG. 7 is a schematic diagram of the overlap preventer in the image reading device according to Embodiment 1.
Figures 8A, 8B:
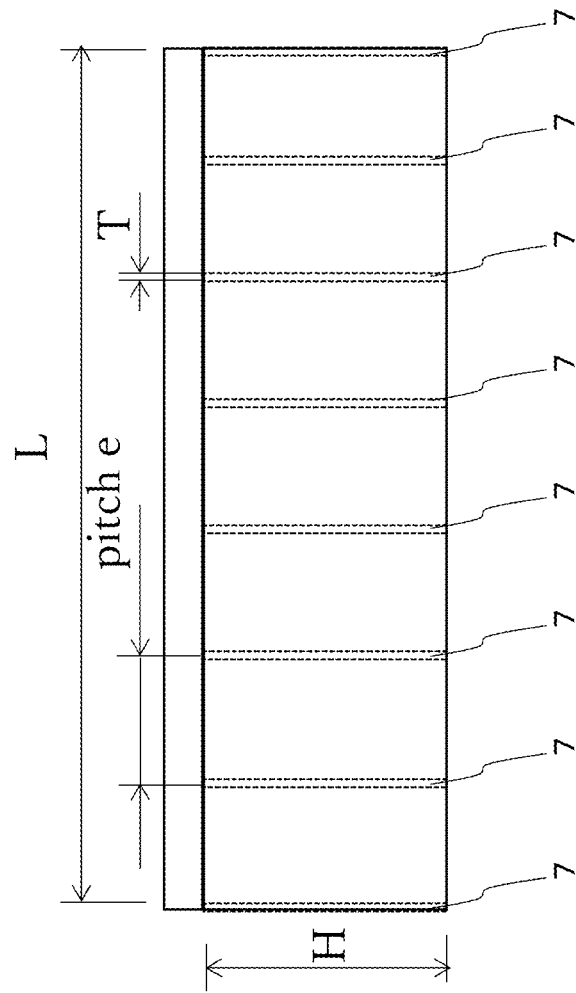
FIGS. 8A and 8B are schematic diagrams of the overlap preventer in the image reading device according to Embodiment 1.

In the slit assembly 5, the slit plates 7 are fixed with the sidewall plates 6 to be held at a regular distance from each other. More specifically, the slit plates 7 are fixed with two sidewall plates 6. Thus, the sidewall plates 6 can also be referred to as spacers 6. In other words, the two sidewall plates 6 (spacers 6) extend in the main scanning direction and face each other in the sub-scanning direction intersecting with the main scanning direction. The multiple slit plates 7 extend in the sub-scanning direction between the two sidewall plates 6 to partition the space between the two sidewall plates 6 to form slits in the slit assembly 5. As shown in FIGS. 6 to 8, each of the sidewall plates 6 may have a portion facing the rod lens array 1 bent in the sub-scanning direction to partially cover the ends of each slit plate 7 to limit light incident on the slit assembly 5. In this case, each of the sidewall plates 6 has an L-shaped cross section when taken in the sub-scanning direction.

The mechanical dimensions of the slit assembly 5 may be determined in the manner described below with the overlap degree m (half of the value acquired by dividing, by the lens diameter $\Phi$, the diameter of an area to which a single rod lens 2 transfers an image at the conjugate point) and an angular aperture $\theta$ for the rod lens 2. The pitch e between adjacent slit plates 7 of the multiple slit plates 7 is smaller than or equal to the value acquired by multiplying the overlap degree m and the lens diameter $\Phi$ by 0.6. The length of the slit assembly 5 (slit plates 7) on the optical path is greater than or equal to the value acquired by dividing the pitch e by a tangent $\theta$ when the rod lens 2 has an angular aperture $\theta$. More specifically, from the relationships for the pitch e of each slit plate 7, $e \leq 0.6 \times m \times \Phi$, and the height of the slit plate 7, $H \geq e/\tan(\theta)$, the pitch e is calculated as about 2.0 mm from $0.5 \times m \times 1$ mm, and the height of the slit plate Z (slit assembly 5) is calculated as about 20 mm from $2.0/\tan(6°)$ with a restriction of 6° allowing for a margin for the lens angular aperture. The height of the slit plate 7 (slit assembly 5) is a dimension in the optical axis direction (optical axis direction for reading). The depth-of-field characteristics in the above conditions are indicated with one of solid lines in FIG. 9. The other solid line indicates the depth-of-field characteristics of a comparative image reading device.

Figure 9:
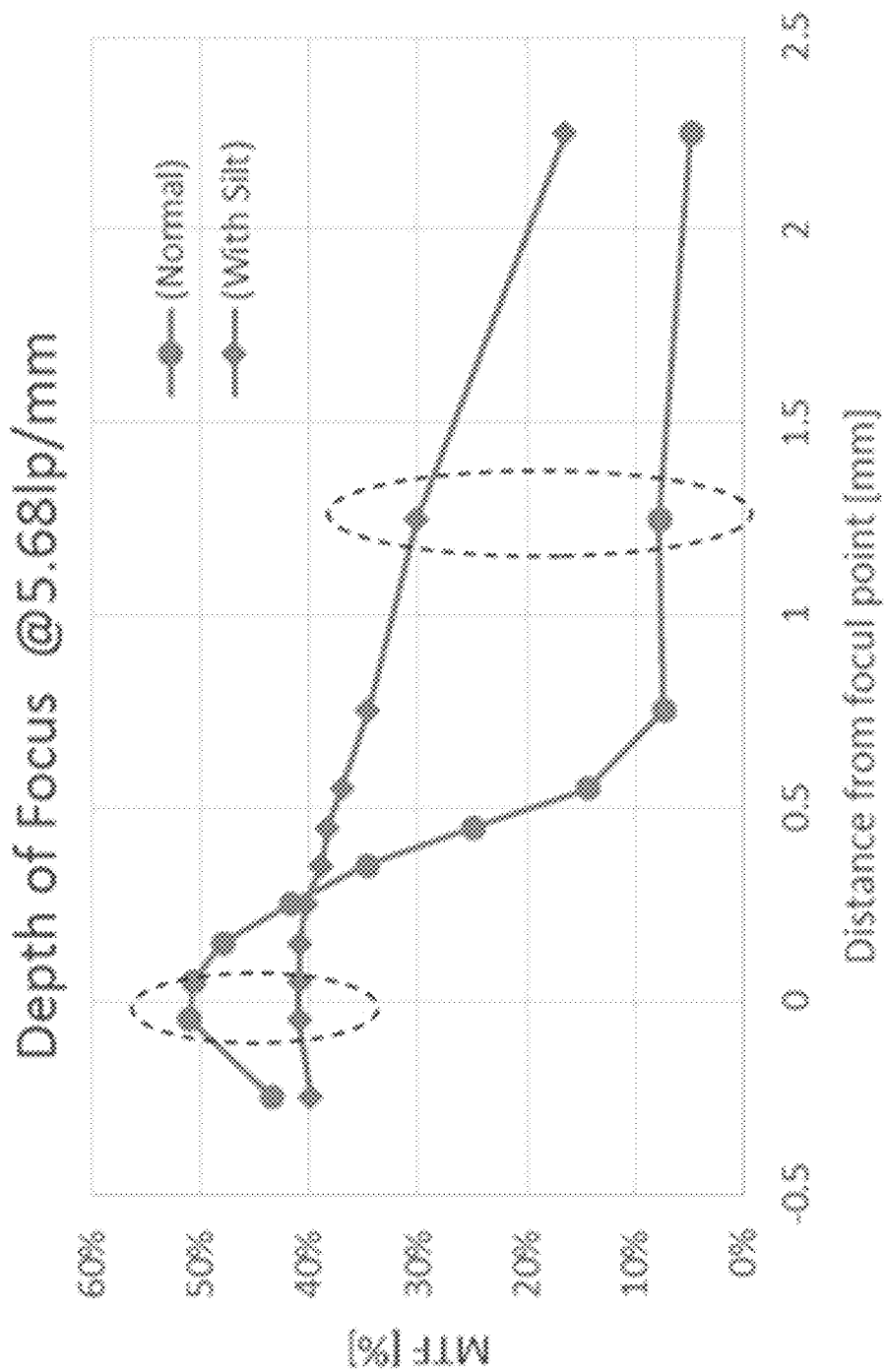
FIG. 9 is a graph showing the depth-of-field characteristics of the image reading device according to Embodiment 1 and an image reading device according to a comparative example.

FIG. 9 shows the depth-of-field characteristics of image reading devices at a resolution of 5.681 lp/mm (line pairs/mm). In FIG. 9, black rhombuses (with silt) denote the depth-of-field characteristics of the image reading device according to Embodiment 1. Black circles (normal) denote the depth-of-field characteristics of an image reading device according to a comparative example. In detail, the image reading device according to Embodiment 1 includes the slit assembly 5 or the overlap preventer 5 (with silt). The image reading device according to the comparative example does not include the overlap preventer 5 (normal). The vertical axis in FIG. 9 indicates the modulation transfer function (MTF) in %. The horizontal axis in FIG. 9 indicates the distance of the reading target 9 (object 9) from the focal position (focus plane or focal point) in mm.

The solid lines in FIG. 9 reveal that the image reading device including the slit assembly 5 greatly improves the depth of field against the position deviation of the reading target 9 in a reading optical axis direction (depth-of-field direction), although the peak resolution at the focal position is lowered slightly (see the right portion in FIG. 9 encircled with a broken line in comparison with the left portion encircled with a broken line). The depth of field can be increased by about three times. When the black velvety surface of each slit plate 7 (slit assembly 5) has a large reflectivity, the reflection slightly causes a reflected image. Thus, the conditions of the black velvety surface (surface of the slit assembly 5) are to be managed. As described above, the black velvety surface includes a black and textured surface.

Figure 10:
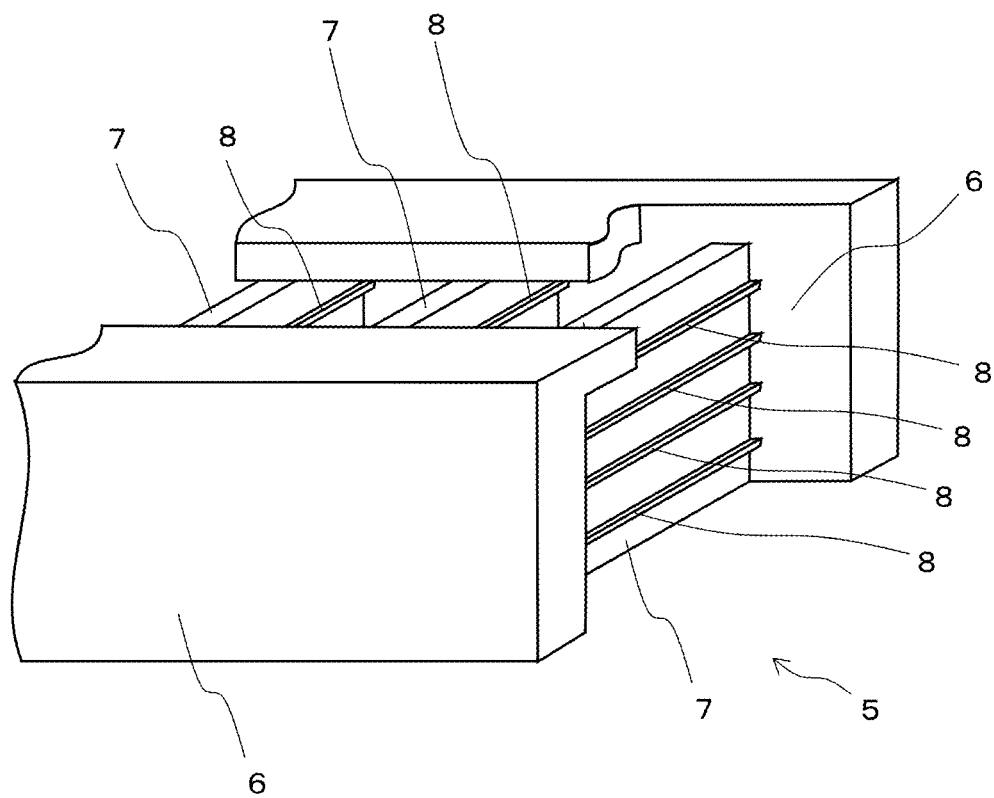
FIG. 10 is a schematic diagram of the overlap preventer in the image reading device according to Embodiment 1.
Figure 11:
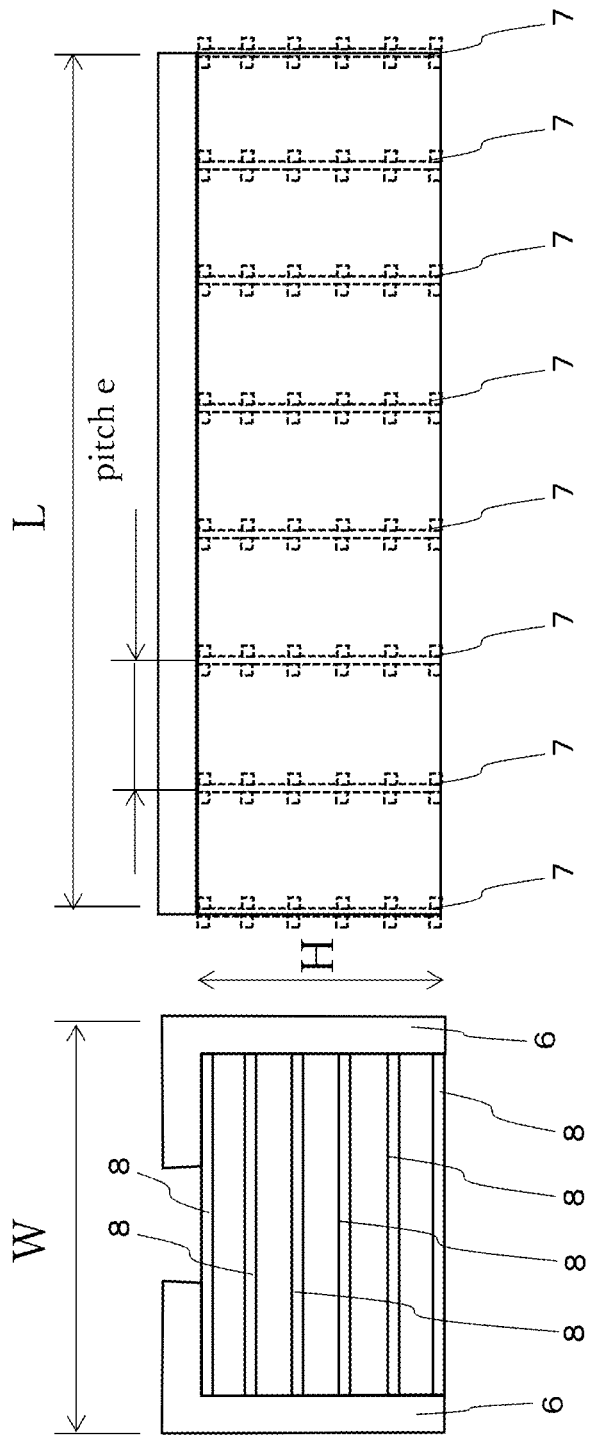
FIGS. 11A and 11B are schematic diagrams of the overlap preventer in the image reading device according to Embodiment 1.
Figure 12:
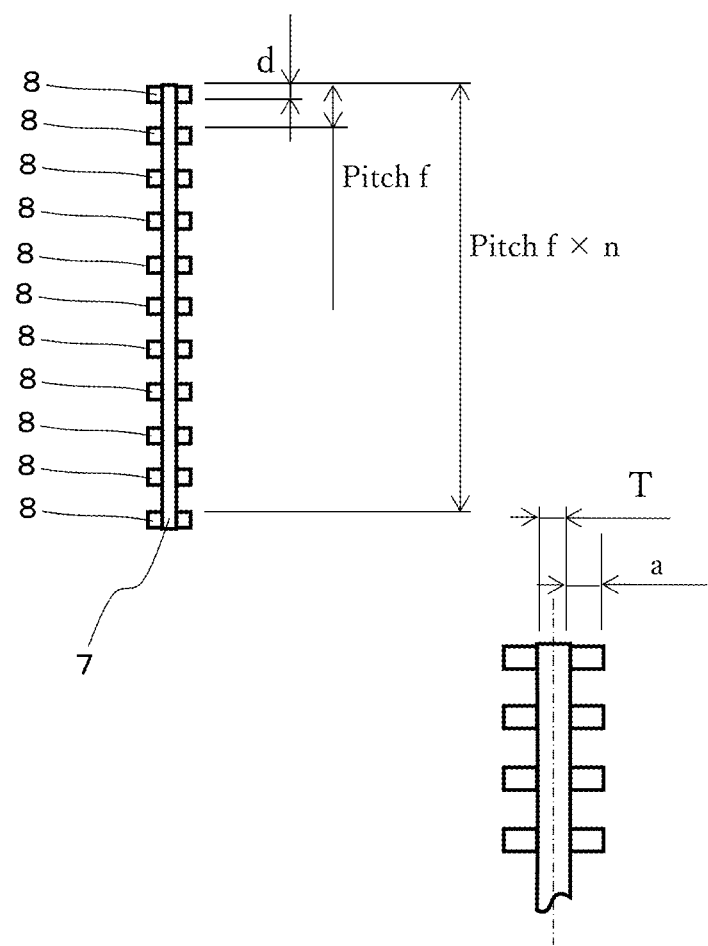
FIG. 12 is a schematic diagram of the overlap preventer (a slit plate and specific-light blockers) in the image reading device according to Embodiment 1.

To block light more stably, the slit assembly 5 described above in the image reading device according to Embodiment 1 may further include the specific-light blockers 8 as shown in FIGS. 10 to 12. The specific-light blockers 8 protrude from the slit plates 7 in the main scanning direction to block specific light incident at an angle smaller than or equal to the angular aperture of the rod lenses 2 from entering the sensor elements 4. More specifically, the specific-light blockers 8 has a mechanical shape to prevent light (specific light) incident at a low angle on the surface (wall surface) of the slit assembly 5 from directly entering the sensor elements 4. The specific-light blockers 8 are beams 8 extending between the sidewall plates 6. The beams 8 (specific-light blockers 8) may be discontinuous with the sidewall plates 6. Each of the specific-light blockers 8 may have a portion nearer the rod lenses 2 protruding further than a portion nearer the sensor elements 4. This will be described in Embodiment 2 in detail.

For example, the specific-light blockers 8 shown in FIGS. 10 to 12 are arranged on the slit plates 7 in the direction parallel to the optical axes of the rod lenses 2. In detail, the black beams (specific-light blockers 8) are at equal intervals in the reading optical axis direction (perpendicular to an optical axis for reading) on the wall surfaces of the slit plates 7 that have undergone a blackening treatment. This structure prevents light incident on the specific-light blockers 8 (beams) at a low angle from being reflected toward the rod lenses 2 and entering the sensor element 4. A predetermined number of specific-light blockers 8 (beams) can block light emitted at an angle of smaller than or equal to 9° from the rod lens 2 with a diameter of about 1 mm.

As shown in FIG. 12, the specific-light blockers 8 (beams) have a thickness d (dimension d in the optical axis direction) of 0.1 mm, a height a (dimension a in the main scanning direction, or height a protruding in the main scanning direction) of 0.1 mm, and a pitch f (pitch for interval f) of 0.55 mm. The slit plates 7 have a thickness T of 0.2 mm. The height a (dimension a in the main scanning direction or height a protruding in the main scanning direction) and the pitch f of the specific-light blockers 8 (beams) depend on an angular aperture $\theta$ of the rod lenses 2. More specifically, the height a and the pitch f may satisfy the relationship $a/f \geq \tan(\theta)$.

With the specific-light blockers 8 (beams), the conditions of the surface (wall surface) of the slit assembly 5 are less likely to affect stable characteristics. Although the peak resolution at the focal position is reduced slightly, the structure including the specific-light blockers 8 (beams) greatly improves the depth of field against the position deviation of the reading target 9 in the reading optical axis direction. The depth of field can be increased by about three times.

Embodiment 2

Figure 13:
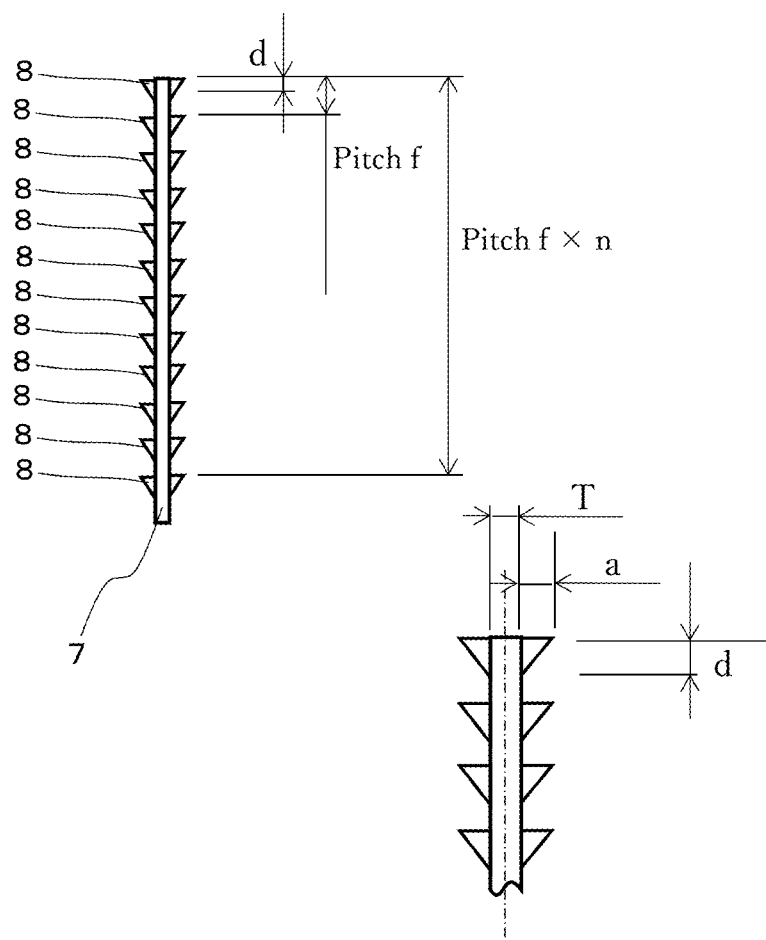
FIG. 13 is a schematic diagram of an overlap preventer (a slit plate and specific-light blockers) in an image reading device according to Embodiment 2.

Embodiment 2 will be described with reference to FIG. 13. The same components or structures as in Embodiment 1 may not be described. In the figure, the same or corresponding components are denoted by the same reference numerals and will not be described in detail. As shown in FIG. 13, an image reading device according to Embodiment 2 includes specific-light blockers 8 (beams) each having a portion nearer the rod lenses 2 protruding further than a portion nearer the sensor elements 4. In other words, the specific-light blockers 8 (beams) have a lower height a (dimension a in the main scanning direction or height a protruding in the main scanning direction) nearer the sensor elements 4 than nearer the rod lenses 2. The specific-light blockers 8 may have a right-angled triangular shape in an imaginary cross section in which the main scanning direction and the optical axis direction intersect with each other. The hypotenuse of this right-angled triangle may be an arc instead of a precise straight line. The specific-light blockers 8 in the image reading device according to Embodiment 1 each have a rectangular shape in an imaginary cross section in which the main scanning direction and the optical axis direction intersect with each other.

With the specific-light blockers 8 included in the image reading device according to Embodiment 2, the hypotenuse of the right-angled triangle forming the profile of each of the specific-light blockers 8 is inclined with respect to the optical axis direction. Thus, light reflected by the specific-light blockers 8 toward the sensor element 4 can be reduced further. The specific-light blockers 8 (beams) in the image reading device according to Embodiment 2 may have the same thickness d (dimension d in the optical axis direction), the same pitch f (pitch for interval f), the same entire dimension t for the slit plates 7 including the specific-light blockers 8 in the main scanning direction, and the same height a (dimension a in the main scanning direction or height a protruding in the main scanning direction) as the specific-light blockers 8 in the image reading device according to Embodiment 1. In this case, the specific-light blockers 8 (beams) have a shorter height a nearer the sensor elements 4. Thus, the image reading device may provide an increased depth of field and image quality more stably. The image reading device according to Embodiment 2 may also satisfy the relationship $a/f \geq \tan(\theta)$.

Embodiment 3

Figure 14A:
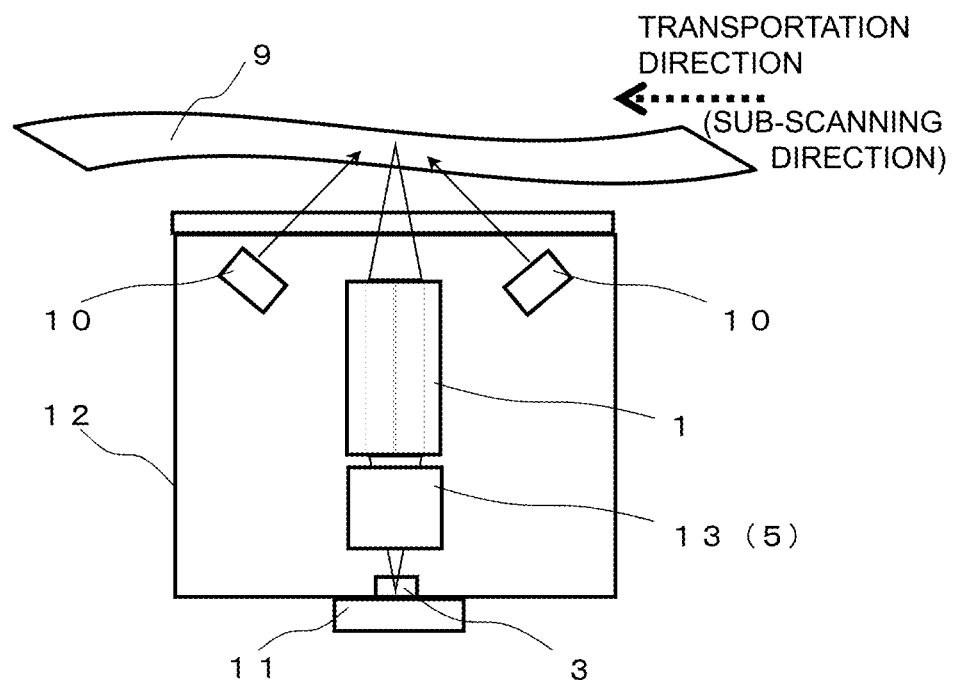
FIGS. 14A and 14B are schematic diagrams of an image reading device according to Embodiment 3.
Figure 14B:
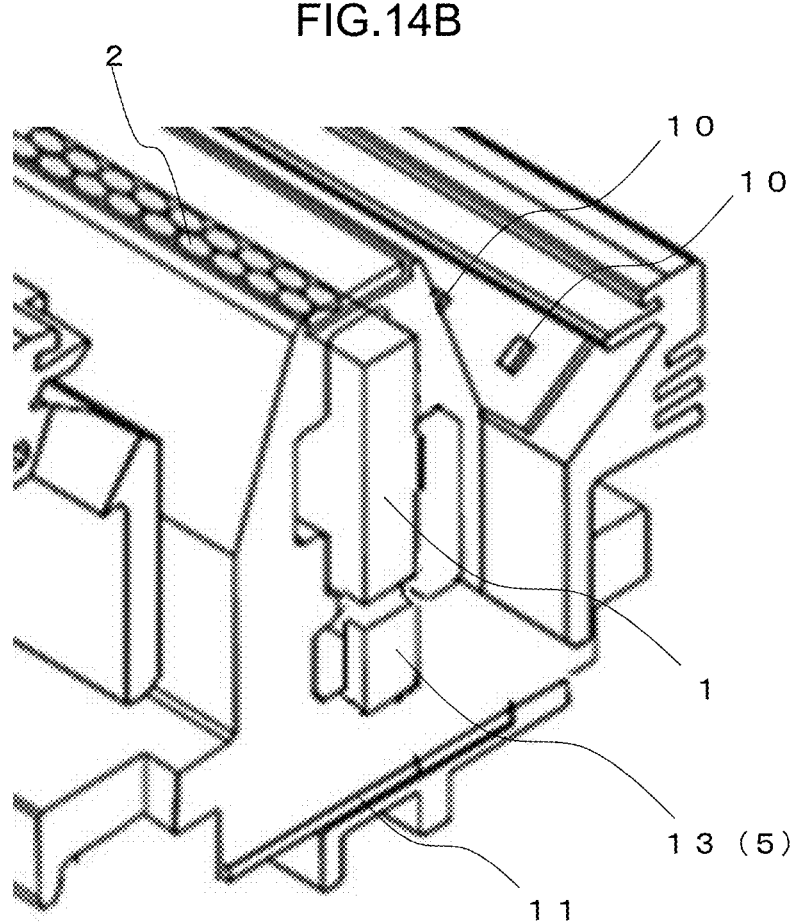
Figure 15:
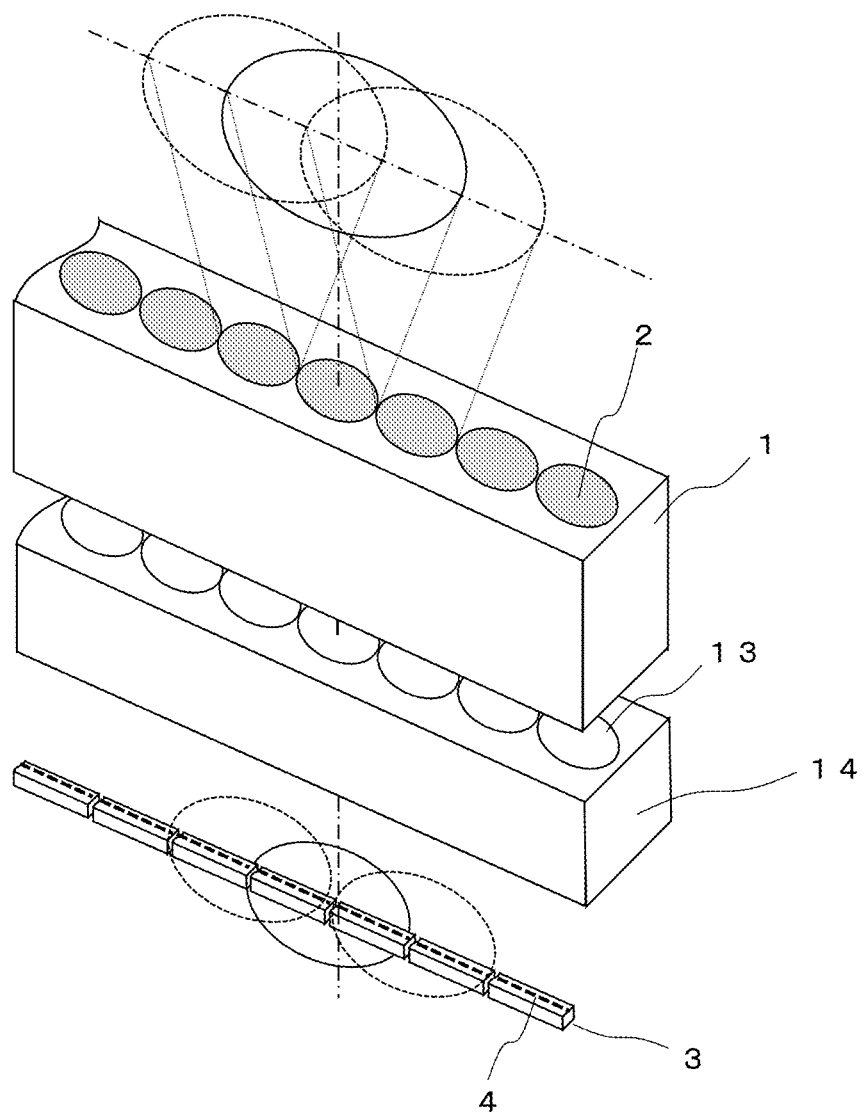
FIG. 15 is a schematic diagram of a lens array, an overlap preventer, and a sensor array in the image reading device according to Embodiment 3.

Embodiment 3 will be described with reference to FIGS. 14A, 14B, and FIG. 15. The same components or structures as in Embodiments 1 and 2 may not be described. In the figures, the same or corresponding components are denoted by the same reference numerals and will not be described in detail. FIG. 14A is a cross-sectional view of an image reading device taken along a plane parallel to a sub-scanning direction (transportation direction). FIG. 14B is a partial perspective view of the image reading device. In FIGS. 14A, 14B, and 15, optically transparent columns 13 (overlap preventers 13) and an optically transparent column array 14 correspond to the slit assembly 5 (overlap preventer 5) described in Embodiments 1 and 2 and are operable as optical path limiters.

The image reading device according to each of Embodiments 1 and 2 includes the slit assembly 5 operable as the overlap preventer 5. Instead of the slit assembly 5 (overlap preventer 5), the image reading device according to Embodiment 3 includes the optically transparent columns 13 (overlap preventers 13). The optically transparent columns 13 (overlap preventers 13) are arranged between the lens array 1 and the sensor array 3 to correspond to the optical axes of the respective lenses 2 to prevent an overlap of images formed by the lenses. Other components in the image reading devices according to Embodiment 3 are the same as those in Embodiments 1 and 2. The optically transparent columns 13 (overlap preventers 13) are not shown in detail.

The optically transparent columns 13 are arrayed in the main scanning direction and correspond one-to-one to the lenses 2 with the bottom surfaces of the optically transparent columns 13 and the bottom surfaces of the lenses 2 facing each other. More specifically, each optically transparent column 13 has a bottom surface opposite to the bottom surface adjacent to the sensor elements 4 facing the bottom surface of each lens 2 nearer the sensor element 4.

For the rod lens 2, the bottom surface of each lens 2 is the bottom surface of a cylinder. For the microlens 2, the bottom surface of each lens 2 is the bottom surface of an imaginary tubular member that supports a group of lenses having the same optical axis. In other words, the bottom surface of each lens 2 includes the surface of the lens 2 nearer the sensor element 4. The optical axis of each optically transparent column 13 and the optical axis of the corresponding lens 2 are aligned with each other. The length of the optically transparent column 13 in the optical axis direction is adjusted to prevent an overlap of images formed by the lenses 2.

More specifically, similarly to the lenses 2 (rod lenses 2) in the lens array 1 (rod lens array 1) arrayed in the main scanning direction, the optically transparent columns 13 are arrayed in the main scanning direction. The array may be referred to as an optically transparent column array 14. Each of the optically transparent columns 13 has the same diameter as the rod lens 2 and allows light to pass through the column. The optically transparent columns 13 have a uniform refractive index and transmittance. The optically transparent columns 13 may be made of glass or resin, and may have a side surface treated with an anti-diffusion treatment, an anti-reflective treatment, or both. The optically transparent columns 13 may have no distortion.

The optically transparent columns 13 correspond one-to-one to the rod lenses 2 with the bottom surfaces of the optically transparent columns 13 and the bottom surfaces of the rod lenses 2 facing each other. The optical axis of each optically transparent column 13 is aligned with the optical axis of the corresponding rod lens 2. Thus, light emitted from each rod lens 2 can be limited by the corresponding optically transparent column 13. In other words, each optically transparent column 13 (overlap preventer 13) is operable as an optical path limiter. Separation between the rod lenses 2 (overlap of images) can be adjusted by changing the length of the optically transparent columns 13.

The image reading device according to Embodiments 1, 2, and 3 described above can prevent light (specific light) incident at a low angle from directly entering the sensor elements 4 by limiting the optical path using the slit assembly 5 or the optically transparent column 13. Thus, the image reading device can stably achieve an increased depth of field and image quality without changing the basic characteristics of lenses.

REFERENCE SIGNS LIST

1 Lens array (Rod lens array)
2 Lens (Rod lens)
3 Sensor array
4 Sensor element (Sensor IC)
5 Slit assembly (Overlap preventer)
6 Sidewall plate (Spacer)
7 Slit plate
8 Specific-light blocker (Beam)
9 Reading target (Illumination target, Object)
10 Light source
11 Sensor substrate
12 Housing
13 Optically transparent column (Overlap preventer)
14 Optically transparent column array

The invention claimed is:

1. An image reading device, comprising:
a lens array including lenses arrayed in a main scanning direction;
a sensor array including sensor elements arrayed in the main scanning direction, the sensor elements being configured to receive light converged by the lenses; and
an overlap preventer located between the lens array and the sensor array, the overlap preventer being configured to prevent an overlap of images formed by the lenses, the overlap preventer being a slit assembly, wherein
the slit assembly includes
two sidewall plates extending in the main scanning direction and facing each other in a sub-scanning direction intersecting with the main scanning direction,
a plurality of slit plates extending in the sub-scanning direction between the two sidewall plates to partition a space between the two sidewall plates, and
at least one specific-light blocker protruding from each of the plurality of slit plates in the main scanning direction to block specific light incident at an angle smaller than or equal to an angular aperture of the lenses from entering the sensor elements,
the at least one specific-light blocker includes a beam extending between the two sidewall plates and has a portion nearer the lenses protruding farther than a portion nearer the sensor elements, and
the at least one specific-light blocker has a right-angled triangle shape in a cross-section in which the main scanning direction and an optical axis direction of a corresponding lens in the lens array intersect with each other, wherein a hypotenuse of the right-angled triangle shape is an arc.

2. The image reading device according to claim 1, wherein
the plurality of slit plates and the at least one specific-light blocker each have a black surface.

3. The image reading device according to claim 2, wherein
the black surface is black and velvety.

4. The image reading device according to claim 1, wherein
the two sidewall plates each have a black surface on at least a surface continuous with the plurality of slit plates.

5. An image reading device, comprising:
a lens array including lenses arrayed in a main scanning direction;
a sensor array including sensor elements arrayed in the main scanning direction, the sensor elements being configured to receive light converged by the lenses; and
an overlap preventer located between the lens array and the sensor array, the overlap preventer being configured to prevent an overlap of images formed by the lenses, the overlap preventer being a slit assembly, wherein
the slit assembly includes
two sidewall plates extending in the main scanning direction and facing each other in a sub-scanning direction intersecting with the main scanning direction, and
a plurality of slit plates extending in the sub-scanning direction between the two sidewall plates to partition a space between the two sidewall plates to form a plurality of slits,
a number of the slits of the slit assembly that are arranged in the main scanning direction is smaller than a number of the lenses of the lens array that are arranged in the main scanning direction, and
an interval between adjacent slit plates of the plurality of slit plates is smaller than or equal to a value acquired by multiplying a diameter of the lens, an overlap degree of the lens, and 0.6.

6. The image reading device according to claim 5, wherein
a ratio of the number of the lenses of the lens array that are arranged in the main scanning direction to the number of the slits of the slit assembly that are arranged in the main scanning direction is 3 to 2.

7. The image reading device according to claim 6, wherein
the slit assembly further includes at least one specific-light blocker protruding from each of the plurality of slit plates in the main scanning direction to block specific light incident at an angle smaller than or equal to an angular aperture of the lenses from entering the sensor elements.

8. The image reading device according to claim 7, wherein
the at least one specific-light blocker includes a beam extending between the two sidewall plates and has a portion nearer the lenses protruding farther than a portion nearer the sensor elements.

9. The image reading device according to claim 7, wherein
the plurality of slit plates and the at least one specific-light blocker each have a black surface.

10. The image reading device according to claim 9, wherein
the black surface is black and velvety.

11. The image reading device according to claim 6, wherein
the two sidewall plates each have a black surface on at least a surface continuous with the plurality of slit plates.

12. The image reading device according to claim 5, wherein
the slit assembly further includes at least one specific-light blocker protruding from each of the plurality of slit plates in the main scanning direction to block specific light incident at an angle smaller than or equal to an angular aperture of the lenses from entering the sensor elements.

13. The image reading device according to claim 12, wherein
the at least one specific-light blocker includes a beam extending between the two sidewall plates and has a portion nearer the lenses protruding farther than a portion nearer the sensor elements.

14. The image reading device according to claim 12, wherein
the plurality of slit plates and the at least one specific-light blocker each have a black surface.

15. The image reading device according to claim 14, wherein
the black surface is black and velvety.

16. The image reading device according to claim 5, wherein
the two sidewall plates each have a black surface on at least a surface continuous with the plurality of slit plates.

* * * * *